(12) United States Patent
Parkkinen

(10) Patent No.: US 6,675,201 B1
(45) Date of Patent: Jan. 6, 2004

(54) METHOD FOR DOWNLOADING SOFTWARE FROM SERVER TO TERMINAL

(75) Inventor: Jukka Parkkinen, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/517,566

(22) Filed: Mar. 2, 2000

(30) Foreign Application Priority Data

Mar. 3, 1999 (FI) .................................................. 990461

(51) Int. Cl.[7] ............................................. G06F 15/167
(52) U.S. Cl. ........................................ 709/216; 717/168
(58) Field of Search .............................. 717/168–178; 380/25; 709/216, 217

(56) References Cited

U.S. PATENT DOCUMENTS 3,996,449 A  * 12/1976 Attanasio et al. ............ 235/431
4,799,258 A  *  1/1989 Davies ......................... 713/159
5,349,643 A      9/1994 Cox et al. ...................... 380/25
6,332,025 B2 * 12/2001 Takahashi et al. ........... 380/281

FOREIGN PATENT DOCUMENTS

EP         0886202 A2      12/1998

* cited by examiner

Primary Examiner—Kristine Kincaid
Assistant Examiner—Sindya Narayanaswamy
(74) Attorney, Agent, or Firm—Perman & Green, LLP

(57) ABSTRACT

The invention relates to a telephone system and a method for downloading software from a server (128) to a terminal (100, 102), the method comprising the steps of attaching to the software a certificate confirming the authenticity of the software and the loader; downloading the software from a source computer (134) to the server (128); downloading the software from the server (128) to the terminal (100, 102). In the method of the invention a first electronic signature confirming the authenticity of the software is attached to the software at the server (128). After the software is downloaded, a second electronic signature is generated at the terminal from the loaded software and the authenticity of the software is checked by comparing the first electronic signature with the second.

10 Claims, 3 Drawing Sheets

METHOD FOR DOWNLOADING SOFTWARE FROM SERVER TO TERMINAL

FIELD OF THE INVENTION

The invention relates to a method for downloading software from a server to a terminal in a telephone system comprising a plural number of terminals and a management system server that monitors and controls the operation of the terminals, a terminal of the system comprising means for storing one or more software.

BACKGROUND OF THE INVENTION

As radio telephone systems become increasingly common and their coverage areas grow—the systems often replacing those implemented by fixed line telephone connections—it has become necessary to develop telephone networks supporting radio telephone systems such as cellular radio systems. Such telephones are needed, for example, in areas where fixed line telephone connections do not exist, or in applications in which the terminal is in a place, for example in a moving vehicle, where connection to a fixed network is not easily available. The present invention can be applied particularly to systems implemented by means of cellular radio systems.

The systems and terminals involved include pay phones, so-called WLL (wireless local loop) terminals, payment terminals at points of sale and smart card terminals supporting transfer of money between a card and a bank.

The functions in current terminals are to a large extent implemented by means of various types of software. The terminal comprises a processor and memory into which the necessary software is stored. When the user selects a function, the software is read from the memory and carried out. In the designing of terminals, a compromise between the number of functions and the available memory capacity has been necessary. Due to reasons of cost, the size of the memory in the terminals cannot be infinitely increased, therefore the memory limits the number of the functions.

Let us study, by way of example, a pay phone system implemented by means of a radio system. The system comprises a plural number of pay phones, each communicating with base stations over a radio path. For the radio path and the base station, the terminals functioning as pay phones do not deviate in any way from conventional subscriber terminals. For collection of payments, the pay phones comprise a collection device that can typically be a payment card reading device. Numerous different payment cards are available, such as different types of credit cards, reloadable payment cards, bank cards, etc. In addition, the card types vary according to the card manufacturer and the company offering the card, and different facilities can be selected for one and the same card. Each card type requires the terminal to be provided with software supporting the card, i.e. a card application. The card application comprises the routines required for the terminal's user interface, for controlling the card and for performing a transaction, such as a payment.

To have card applications supporting all card types stored into the memory of a terminal reading a card would require such a large memory that the terminal would be expensive. Furthermore, the adding of new card applications to the terminal would require the software of the entire equipment to be changed at hardware maintenance.

Problems similar to those relating to pay phones also affect other wireless devices in which payment cards are read, such as reloading devices allowing electronic money to be loaded from a bank account to a payment card.

To solve the above problem, it is advantageous if software can be downloaded through the network when necessary, thereby allowing the terminal's memory to be optimally utilized. When a card is inserted into a terminal which does not have software corresponding to the card, the terminal can download the needed software to its memory through the network from a predetermined server.

This method has, however, its shortcomings. The use of software downloaded from a network involves risks that must be taken into account. It is important that the software to be downloaded is flawless and does not contain software viruses, for example, or other harmful elements. It is also important to be able to verify that the software is downloaded from the correct server and that it is manufactured by the correct software manufacturer. A defective software can cause malfunction in the terminal, such as unintended calls and transactions to wrong addresses.

BRIEF DESCRIPTION OF THE INVENTION

An object of the invention is therefore to provide a method and an apparatus implementing the method so as to allow the above problems to be solved. This is achieved with a method for downloading software from a server to a terminal, the method comprising the steps of attaching to the software a certificate confirming the authenticity of the software manufacturer and the loader; downloading the software from a source computer to the server; calculating a check sum for the software and the certificate; and downloading the software from the server to the terminal. The method of the invention further comprises the steps of adding the check sum confirming the authenticity of the software to the software at the server before the software is downloaded to terminals; generating a second check sum at the terminal from the downloaded software, after the software has been downloaded; and checking the authenticity of the software at the terminal by comparing the first check sum with the second.

The invention further relates to a telephone system comprising a plural number of terminals and a server monitoring and controlling the operation of the terminals, the server being arranged to calculate a check sum for the software and the certificate attached to the software; a terminal of the telephone system comprising means for storing one or more software, and the system comprising one or more source computers arranged to upload software to the server, the terminals being arranged to download the software from the server. In the telephone system of the invention the server is arranged to attach to the software a first check sum confirming the authenticity of the software before the software is downloaded to the terminals, and a terminal is arranged to generate a second check sum from the downloaded software, after the software has been loaded, and that the terminal is arranged to check the authenticity of the software by comparing the first check sum with the second.

The dependent claims relate to preferred embodiments of the invention.

The method and system of the invention provide several advantages. With the solution of the invention it is easy to ensure that the software is safe and that it is uploaded to the server from a safe source computer. The invention employs digital signature to ensure the authenticity of the software. Corresponding methods have earlier been applied only in connection with electronic mail transmissions.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

In the following the invention will be described, by way of example, with reference to a pay phone system implemented by applying a digital GSM mobile phone system, the invention not being, however, limited to the example. It is apparent that the solution of the invention can be modified to apply to telephone systems implemented by means of any other technology and comprising terminals which include functions operated by means of software applications.

Figure 1:
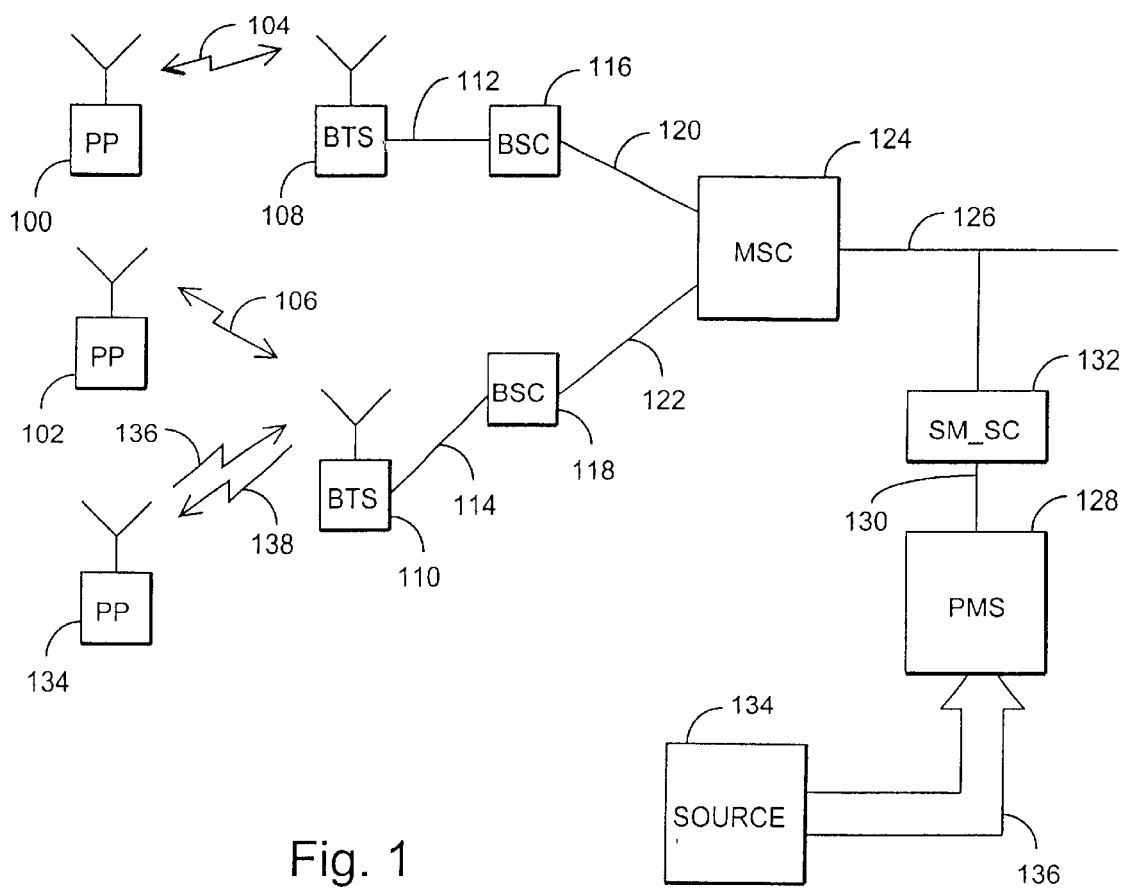
FIG. 1 is a diagram illustrating a structure of a telephone system of the invention.

FIG. 1 illustrates a structure of a pay phone system implemented in a cellular radio network. The system comprises a plural number of pay phones 100–102, each connected via a radio path 104–106 to base stations 108–110. For the radio path or the base station, terminals operating as pay phones do not differ in any way from conventional subscriber terminals. The base stations 108–110 are typically connected to base station controllers 116–118, each, controller controlling a plural number of base stations, via transmission lines 112–114 which can be implemented by means of optical cables, copper cables or link connections. The base station controllers 116–118, in turn, are connected via transmission lines 120–122 to a mobile services switching center 124 which controls the operation of the base station controllers and transmits calls from the terminals to a fixed network or to other parts of the cellular radio system via transmission lines 126.

The pay phone system further comprises a management system server 128 which controls and monitors the operation of the pay phones 100–102. In the GSM system used as an example, a control equipment server 128 of the pay phone system is connected via an X.25 interface 130, for example, to a short message center 132 which is, in turn, connected to GSM cellular networks and their mobile switching centers. The above description of the cellular radio system thus relates to the GSM system, but it is obvious that although the details of other systems vary from the above description, there are no essential structural differences. It should be noted that also in the GSM system the pay phone system can be implemented without the short message center, by connecting the control equipment server 128 of the pay phone system to the cellular radio system by employing other prior art methods, such as a modem.

The system of the invention further comprises a source computer 134, such as a computer of the manufacturer of the software used in the terminals. The source computer 134 is connected to the server 128 via a telecommunications network 136, such as the Internet or a private network. Both the server and the source computer can be implemented as computer hardware having the required telecommunications characteristics and the appropriate software.

Figure 2:
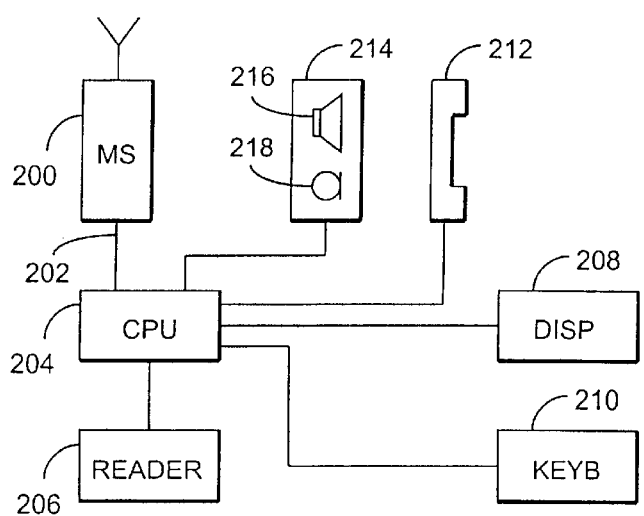
FIG. 2 is a block diagram illustrating a structure of a terminal of a system according to the invention.

FIG. 2 illustrates an example of a preferred embodiment of a pay phone according to the system of the invention. The pay phone of the invention comprises a cellular radio transceiver 200 and a control unit 204 which has a direct connection 202 to the transceiver 200 without a two-wire connection. The terminal of the invention further comprises a collection means 206 connected to the control unit 204. Depending on the application, the collection means can accept phone cards, credit cards or smart cards as means of payment. The terminal typically also comprises a dialling means 210 for dialling the desired telephone number, display unit 208 and an earpiece 212. The terminal can also comprise means 214 allowing a hands free facility, the means comprising a speaker 216 and a microphone 218, and the necessary amplifiers. If desired, some or all of the above components can be directly integrated into the transceiver 200, or they can be implemented as separate means, although structurally possibly within the same casing.

The function of the transceiver unit 200 is to provide, when necessary, a radio connection to a base station to allow a call to be transmitted. The unit 200 also takes care of all operations (usually carried out by a mobile phone) concerning the maintenance of the radio path and the call.

The function of the control unit 204 is to control the pay phone. The control unit typically comprises a micro processor, fixed and reprogrammable memory circuits, multiplexing means and switches. The control unit controls the operations of other units included in the equipment, registers placed calls and takes care of debiting. The operational parameters of the pay phone are usually stored in the control unit's memory. Such telephone-specific parameters include telephone number, tariff data relating to the calls to be placed, language options on the telephone's display and volume of voice. Except for the inventive features described in the present application, the operation of the control unit does not basically differ from the operation of the control units of prior art pay phones.

The details of the terminal structure can also vary from the above description depending on the purpose of use of the terminal. For example, if the terminal is a payment terminal used at a point of sale, the device does not necessarily include audio parts such as a microphone or speaker. At its simplest, the terminal comprises a cellular radio transceiver, a control unit and collection means which can be structurally integrated with each other or, alternatively, they may be components detachable from one another and temporarily connected together for the duration of a call payment or a purchase transaction, for example.

The software needed by the terminal are stored into the memory of a control unit 204. The software concerned include software, or card applications, needed by various payment card alternatives. A card application comprises routines needed for the terminal's user interface, for controlling a card and for carrying out a card transaction, such as a payment.

Figure 3:
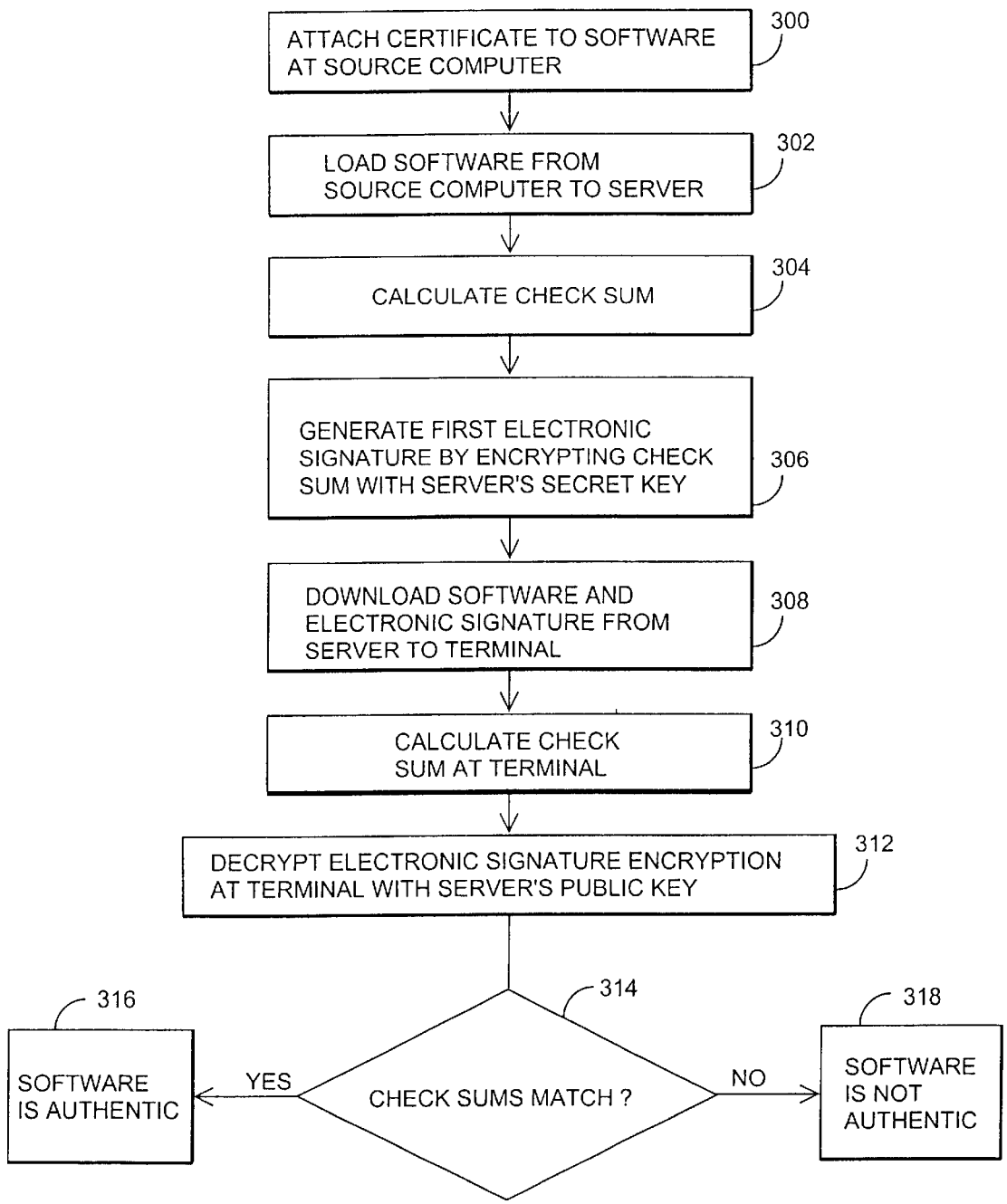
FIG. 3 is a flow chart illustrating a method of the invention.

Let us then study the method of the invention with reference to a flow diagram shown in FIG. 3. As stated above, the system of the invention allows software to be downloaded to terminals, when necessary, from the system server. To ensure the authenticity of the software it is important that software can only be uploaded to the server from a source the authenticity of which has been confirmed. In the solution of the invention, each software supplier is therefore provided with a specific digital certificate that allows the software supplier, or the supplier's computer (hereinafter referred to as the source computer) from which the software is uploaded to the server, to be identified. The certificate is granted by a third party, such as the terminal manufacturer.

In step 300 of FIG. 3, the software producer attaches a digital certificate confirming the authenticity of the software to the software to be transferred to a server. In step 302 the software is uploaded from the software producer's source computer via, for example, the Internet or another link to the network server which in this example is the server of the pay phone system. In a preferred embodiment of the invention, the server checks the source computer's certificate in connection with the downloading.

When software is downloaded to terminals, it is also essential that the software is downloaded from an official server agreed on in advance and not from a disturber that has connected to the network. It is therefore necessary that the origin of the software can be verified from the software. For this purpose the software is provided with an electronic signature at the server, the signature being attached to the software in step 306. In the preferred embodiment of the invention, the electronic signature is generated by calculating a check sum in step 304 for the software and the certificate and by attaching the check sum to the software in step 306, preferably by using encryption, thereby preventing any external party from corrupting the sum. The check sum itself can be calculated by applying methods known to those skilled in the art. One way of implementing the encryption is to use a public key and secret key encryption method. The electronic signature is attached to the software at the server in step 306 by using the server's secret key which outsiders do not know. The encrypted information can then be decrypted by using a public key at the terminal. In the solution of the invention, encryption methods known to those skilled in the art can be used.

In step 308 the terminal downloads the software needed from the server. After the terminal has downloaded the software, it checks the authenticity of the software in step 310 by calculating, similarly as at the server, the check sum of the downloaded software and the certificate attached to the software. The terminal then decrypts the encrypted electronic signature attached to the software at the server in step 312 by using the server's public key. As a result of the decryption, the check sum calculated at the server is obtained. The terminal compares the check sum it has calculated with that calculated at the server in step 314, the result of the comparison allowing the terminal to decide the authenticity. If the check sums match, the software is authentic (step 316), but if the check sums do not match, the source of the software is not authentic (step 318) and the software cannot be taken into use.

Figure 4:
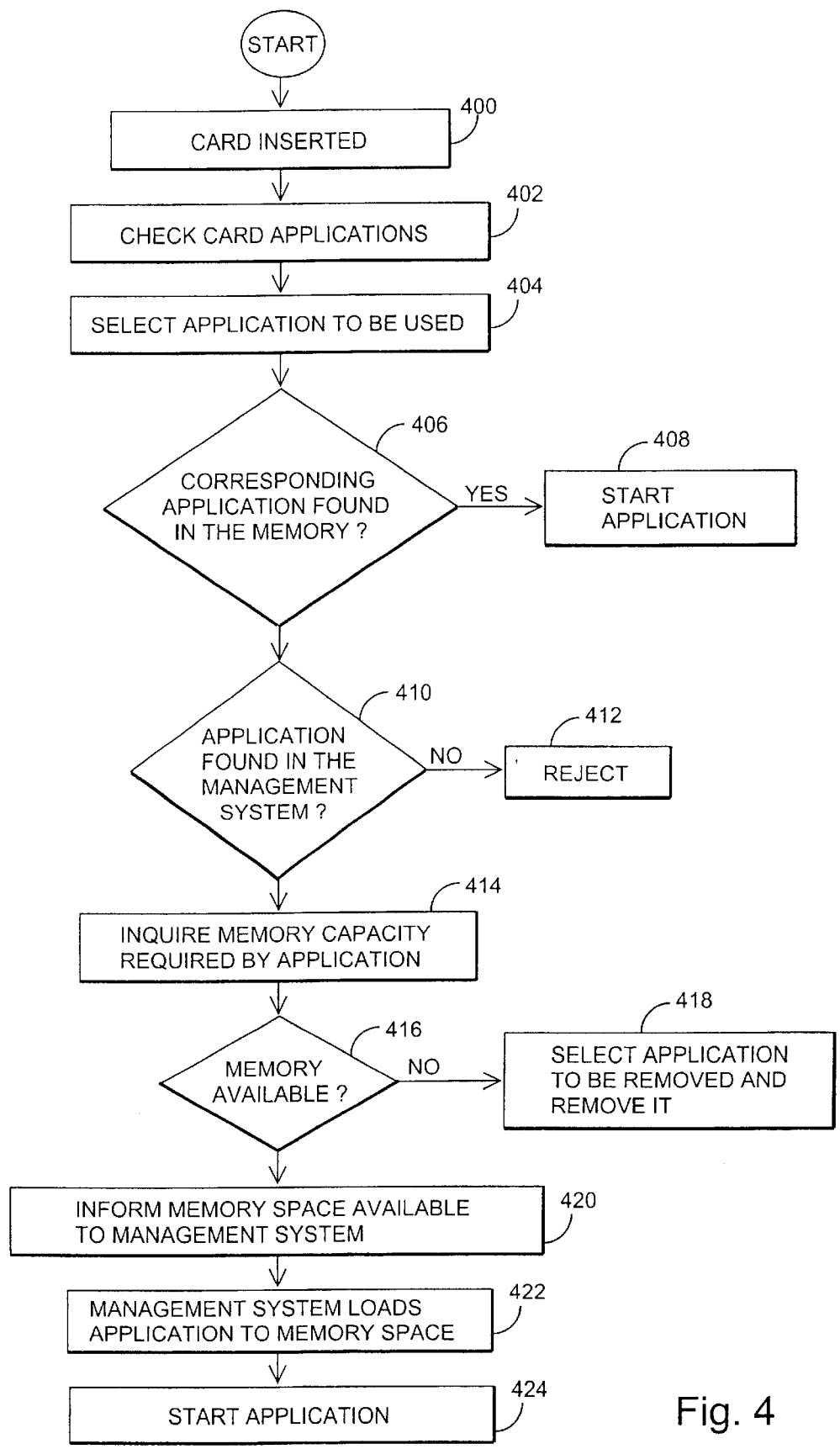
FIG. 4 is a flow chart illustrating the downloading of software.

Let us then study an example of a situation where the above described downloading of the software cannot be carried out; this is illustrated in a flow diagram of FIG. 4. In step 400 the user has inserted a card into a card reader 206 of a terminal. In step 402 the terminal checks the different functions of the card, for example, any credit card alternatives included. If several options are available, the user gets to select the function to be used. The routine then proceeds to step 406 to check whether an application required by the selected function is included in the terminal's memory. The application keeps record of the applications available in its memory at a particular moment. If the application is in the memory, it can be started in step 408.

If the application is not in the terminal's memory, the routine proceeds to step 410 to check whether the application is in the management system's server. Information about the applications that can be downloaded from the server can be stored either in the terminal, or the terminal can request the information from the server. If the application cannot be found from the management system, the function is rejected in step 412 and the user is asked to give a new one, provided that the card contains several functions.

If the application is on the management system's server, the terminal asks in step 414 the amount of memory required by the application. The terminal then checks in step 416 whether the amount of memory required by the application is available. If there is not enough memory available, an application to be removed from the memory is selected and removed in step 418 so as to release memory for the new application. The terminal can let the user select the application to be removed or, alternatively, the terminal can make the decision on the basis of a predetermined criterion. One criterion is to keep recently used applications and to remove an application that has been unused for the longest.

The terminal then informs in step 420 the server of a free memory area where the application should be placed. For example, the terminal can inform a memory area 312, shown in FIG. 3, to be available for the application. The management system's server downloads in step 422 the application to the memory area informed by the terminal. The application is then ready to be taken into use in step 424.

In another alternative embodiment the management system's server does not control the placing of the application into the terminal's memory, but only transmits the application to the terminal which then places the application into its memory.

In addition to payment card applications, a downloadable software can comprise facilities transferred in an electronic form, such as timetable information or tickets.

Method steps associated with the terminal of the invention can be advantageously implemented by software at the terminal's control unit 204. The connection to the management system's server required by the method can be advantageously provided by means of a data call connection. A data call is a call type that is available in digital radio networks; it corresponds to a modem connection in analog systems.

At the management system's server and in the software manufacturer's source computer the functions of the invention can be advantageously implemented by means of software.

Although the invention is described above with reference to an example shown in the attached drawings, it is apparent that the invention is not restricted to it, but can vary in many ways within the inventive idea disclosed in the attached claims.

What is claimed is:

1. A method for downloading software from a server (128) to a terminal (100, 102), the method comprising the steps of
   attaching to the software a certificate confirming the authenticity of the software manufacturer and the loader;
   uploading the software from a source computer (134) to the server (128);
   calculating a check sum for the software and the certificate; and
   downloading the software from the server (128) to the terminal (100, 102),
   characterized in that the method further comprises the steps of:
   generating an electronic signature at the server (128) by calculating for the software and the certificate a common check sum which is encrypted by means of a secret key of the server,
   attaching the check sum confirming the authenticity of the software to the software at the server (128) before the software is downloaded to terminals;
   generating a second check sum at the terminal from the downloaded software, after the software has been downloaded;

the encryption of the secret key is decrypted at the terminal and checking the authenticity of the software at the terminal by comparing the first check sum with the second.

2. A method according to claim 1, characterized in that the authenticity of the software is always checked at the terminal (100, 102) when the software is carried out.

3. A method according to claim 1, characterized in that the encryption of the secret key is decrypted at the terminal (100, 102) by means of a public key of the server (128).

4. A method according to claim 1, characterized in that the terminal (100, 102) detects that a payment card is inserted into the terminal's card reader (206) and the user has selected an application, and that the terminal checks whether the software needed for implementing the application can be found in the terminal's memory, and sends the server (128) a loading request comprising information about the software needed, and that the server sends the terminal the software needed, and that the terminal stores the software into its memory.

5. A telephone system comprising:

plural number of terminals (100, 102); and a server (128) monitoring and controlling the operation of the terminals, the server (128) being arranged to calculate a check sum for software and for a certificate attached to the software;

a terminal of the telephone system comprising means (204) for storing one or more software, and the system comprising:

one or more source computers (134) arranged to upload software to the server, the terminals (100, 102) being arranged to download software from the server, characterized in that the server is further adapted to:

generate an electronic signature by calculating for the software and the certificate a common check sum which is encrypted by means of a secret key of the server, attach to the software a first check sum confirming the authenticity of the software before the software is downloaded to the terminals, and a terminal is adapted to decrypt the encrypted secret key and is arranged to generate a second check sum from the downloaded software, after the software has been loaded, and that the terminal is arranged to check the authenticity of the software by comparing the first check sum with the second.

6. A system according to claim 5, characterized in that the terminal is arranged to always check the authenticity of the software when the software is carried out.

7. A system according to claim 5, characterized in that the terminal is arranged to decrypt the encryption of the electronic signature by means of a public key of the server.

8. A method for downloading software from a server to a terminal for payment card applications in a telephone system comprising:

detecting an insertion of a card into a card reader in a terminal;

identifying a payment application associated with the card;

requesting a download of the payment application from the server;

wherein the server is adapted to calculate a check sum for the payment application and a certificate attached to the payment application and attach to the payment a first check sum confirming the authenticity of the payment application prior to a download of the payment application; and wherein the terminal is arranged to generate a second check sum from the downloaded payment application; and verify an authenticity of the payment application by comparing the first check sum with the second check sum.

9. The method of claim 8 wherein the step of identifying the payment application further comprises a user manually selecting, via a user interface, a payment application to be used.

10. The method of claim 8 wherein the step of identifying the payment application further comprises determining if the payment application is stored in a memory of the terminal.

* * * * *